(12) United States Patent
Marin et al.

(10) Patent No.: US 6,568,185 B1
(45) Date of Patent: May 27, 2003

(54) COMBINATION AIR SEPARATION AND STEAM-GENERATION PROCESSES AND PLANTS THEREFORE

(75) Inventors: Ovidiu Marin, Lisle, IL (US); Erwin Penfornis, Oak Park, IL (US)

(73) Assignees: L'Air Liquide Societe Anonyme a'Directoire et Conseil de Surveillance pour l'Etude et l'Exploitation des Procedes Georges Claude, Paris (FR); American Air Liquide, Fremont, CA (US)

(*) Notice: Subject to any disclaimer, the term of this patent is extended or adjusted under 35 U.S.C. 154(b) by 0 days.

(21) Appl. No.: 10/006,350

(22) Filed: Dec. 3, 2001

(51) Int. Cl.$^7$ ............................................. F01K 25/06
(52) U.S. Cl. ............................. 60/649; 60/651; 60/671
(58) Field of Search ........................... 60/649, 651, 671

(56) References Cited

U.S. PATENT DOCUMENTS

| | | |
|---|---|---|
| 3,628,332 A | 12/1971 | Kelmar |
| 4,007,786 A * | 2/1977 | Schlinger .................. 166/266 |
| 4,099,382 A | 7/1978 | Paull et al. |
| 4,116,005 A | 9/1978 | Willyoung |
| 4,382,366 A | 5/1983 | Gaumer |
| 4,545,787 A * | 10/1985 | Hegarty .................... 60/783 |
| 4,665,688 A * | 5/1987 | Schiffers et al. .......... 60/39.12 |
| 4,910,963 A | 3/1990 | Vanzo |
| 5,027,720 A | 7/1991 | Merritt et al. |
| 5,040,370 A | 8/1991 | Rathbone |
| 5,067,837 A | 11/1991 | Panopoulos |
| 5,129,331 A | 7/1992 | Merritt et al. |
| 5,265,424 A | 11/1993 | Merritt |
| 5,388,395 A * | 2/1995 | Scharpf et al. ............ 60/39.12 |
| 5,406,786 A | 4/1995 | Scharpf |
| 5,657,624 A | 8/1997 | Kang et al. |
| 5,680,764 A | 10/1997 | Viteri |
| 5,709,077 A | 1/1998 | Beichel |
| 5,715,673 A | 2/1998 | Beichel |
| 5,937,652 A | 8/1999 | Abdelmalek |
| 5,956,937 A | 9/1999 | Beichel |
| 5,970,702 A | 10/1999 | Beichel |
| 6,047,547 A | 4/2000 | Heaf |
| 6,071,116 A | 6/2000 | Philippe et al. |
| 6,113,389 A | 9/2000 | Joshi et al. |

(List continued on next page.)

FOREIGN PATENT DOCUMENTS

| | | |
|---|---|---|
| EP | 1 172 135 A1 | 1/2002 |
| JP | 2001 41402 | 2/2001 |
| JP | 2001 56104 | 2/2001 |

OTHER PUBLICATIONS

Babcock & Wilcox, Steam, Its Generation and Use, 1978, pp34–10 to 34–25, 39$^{th}$ Edition.

Yantovskii, E.I., The Thermodynamics of Fuel–Fired Power Plants Without Exhaust Gases, World Clean Energy Conference, Geneva, Nov. 1991, Institute for Energy Research, U.S.S.R. Academy of Sciences, Moscow, U.S.S.R.

Mathieu, Ph., and Nihart, R., Sensitivity Analysis of the Matiant Cycle, pp. 775–787, University of Liege, Institut de Mecanique, Belgium.

Primary Examiner—Hoang Nguyen
(74) Attorney, Agent, or Firm—Linda K. Russell (57) ABSTRACT

This invention proposes innovative techniques of NOx reduction in boiler operation through an adaptation of staged combustion in combustion boilers. In preferred processes, air is fed into an air separation unit, and a nitrogen-enriched stream is combined with air to produce a nitrogen-enriched first stage air stream, and at least a portion of an oxygen-enriched stream is mixed with air to produce an oxygen-enriched second stage air stream. A reduction in NOx and increase in efficiency is promoted by the inventive processes and systems.

28 Claims, 5 Drawing Sheets

U.S. PATENT DOCUMENTS

| | | |
|---|---|---|
| 6,170,264 B1 | 1/2001 | Viteri et al. |
| 6,247,315 B1 | 6/2001 | Marin et al. |
| 6,250,916 B1 | 6/2001 | Philippe et al. |
| 6,256,994 B1 | 7/2001 | Dillion, IV |
| 6,263,659 B1 | 7/2001 | Dillon, IV et al. |
| 6,264,466 B1 | 7/2001 | Joshi et al. |
| 6,273,180 B1 | 8/2001 | Joshi et al. |
| 6,276,928 B1 | 8/2001 | Joshi et al. |
| 6,282,901 B1 | 9/2001 | Marin et al. |
| 6,314,896 B1 | 11/2001 | Marin et al. |

* cited by examiner

COMBINATION AIR SEPARATION AND STEAM-GENERATION PROCESSES AND PLANTS THEREFORE

CROSS REFERENCE TO RELATED APPLICATIONS

BACKGROUND OF THE INVENTION

1. Brief Description of the Invention

This invention is related generally to air separation processes, and in particular to air separation processes combined with steam generation facilities.

2. Related Art

The power generation research and development community faces an important challenge in the years to come: to produce increased amounts of energy under the more and more stringent constraints of increased efficiency and reduced pollution. In order to fulfill both of these goals, it now appears that the power plant of tomorrow will likely have to be modular, and the different modules will likely be combined using advanced system integration techniques.

On the other hand, there are a large number of industrial processes requiring significant electric power consumption. One of these processes is the air separation process, where the power consumption can represent around 50 percent of the overall production costs. The need to reduce emissions cost-effectively in boiler operation, especially generation of nitrogen oxides (NOx), has potential to bring together two very different activities: power generation and gas separation.

This invention is based on the combined use of air separation, staged combustion techniques, and oxygen-enrichment processes. Below is a review of the prior art of these three concepts in the field of boiler operation.

a) Staged Combustion

Figure 1:
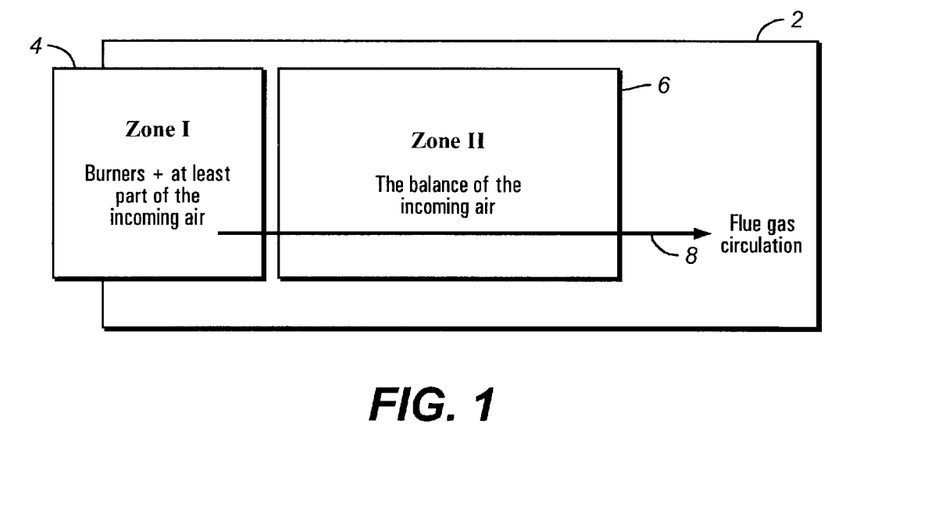
FIG. 1 is a general schematic diagram of a combustion chamber of a steam-generating boiler.

Coal combustion results in a potentially large amount of unburned coal in the stack, thus wasting a large amount of fuel. This problem can be handled by the following process, allowing more complete fuel combustion, as well as a significant reduction of NOx formation. FIG. 1 describes a combustion chamber 2 in a standard boiler. The combustion chamber can be divided into two major zones: Zone I, as denoted in FIG. 1 at 4, represents the area where the burners are located, together with air inlets. The combustion air can enter the combustion chamber together with the fuel (part of the air is used to transport coal into the combustion chamber, namely the primary air), or in different inlets. The combustion air can be introduced into the boiler partially or totally. More modern schemes use a different air inlet in Zone II, as marked in FIG. 1 at 6, in order to improve the combustion process and to lower the NOx emissions. This scheme is termed "staged combustion" since the combustion process occurs in the two zones. It is noted that the above drawing is very general, showing a horizontal flue gas circulation 8. In general this circulation can be in any direction (upward, side-wards, downward, and the like).

The combustion process is thus divided into two major zones: Zone I represents the ignition zone, where the fuel(s) enter the combustion chamber, are heated and ignite. When coal is of a lesser quality, additional fuel (generally natural gas or fuel oil) is required for a fast ignition. Zone II represents the final region allocated for combustion. Additional oxidant may be introduced, as mentioned above. The modern staged combustion systems allow a significant portion of the oxidant to enter in Zone II (between 10 and 50% of the total oxidant).

However, due to the low pressure of the incoming air in Zone II, the flow patterns of the main flue gas stream are sometimes relatively undisturbed, thus the mixing between the two streams is relatively poor, preventing the full combustion of the unburned fuel.

A solution to this problem, which can be seen in the prior art, is to introduce a high velocity of oxidizer into Zone II through a multitude of streams, for a better mixing. This invention will also address this problem of mixing, through the use of an oxygen-enriched gas introduced into Zone II. The addition of enhanced oxidant (when compared to air) to the fuel rich combustion products will lead to a more effective and complete fuel combustion.

b) Oxygen Enrichment

Oxygen-enriched combustion has become a popular technique employed in a series of industrial applications, such as glass, steel, aluminum and cement manufacturing, to name only a few. The employment of the oxygen-enriched technique has proven to lead to significant process improvements in these industries, such as fuel savings, production increase, and waste processing. Presently, there are applications where the employment of oxygen enriched-combustion has not yet started to be applied on a large scale. One of these applications are the steam generators, where very large amounts of fuel are used for combustion purposes.

The existing boilers have a wide range of steam output, requiring an energy input, from a few hundred kilowatts (kW) to thousands of megawatts (MW). However, the very large investment required for a steam generator, together with the already high thermodynamic efficiency of the existing boilers make the introduction of operational changes relatively hard to implement. The boiler operators are reluctant to introduce modifications in the boiler characteristics, due to possible changes in water vapor properties (temperature, humidity, etc.). Different heat transfer patterns into the various areas of the boiler (combustion space, convective regions) will lead to different local vaporization/superheating rates of the steam, with direct impact on the boiler pipes. Local vapor superheating may lead to lower heat transfer coefficients, therefore to local pipe overheating, eventually causing cracks in pipes. It is therefore crucial to maintain relatively unchanged the heat transfer patterns as originally designed, in order to produce safely the designed vapor throughput.

The use of oxygen-enriched combustion has two consequences to the boiler: it reduces the mass fraction of nitrogen, and it increases the adiabatic temperature of the flame, thus increasing the local heat transfer rates, primarily the radiative heat transfer.

The prior art in the use of oxygen-enriched combustion indicates that it may lead to reduced flue gas mass flow rates flowing through the boiler, with negative implications on the convective heat transfer. This invention will also address this issue, by maintaining the flue gas mass flow rate unchanged from the designed parameters, in conditions of reduced NOx emissions c) Air Separation Air separation consumes a large amount of electric power, mostly for air compression—just like the gas turbine cycle. At the same time, the cryogenic air separation unit cools the gases down in order to separate the different components. Pressurizing cold gases requires by comparison a smaller compressor work, when compared to hotter gases. Also, pressurizing liquid leads to important energy savings when compared to pressurizing gas. Finally, some of the separated gases leave the air separation plant with residual pressure (especially when using membranes), which has potential to be used by an integrated process.

It is noted that the term "air separation" includes any technology of air separation, including cryogenics, membranes, adsorption methods, and the like. The outputs nitrogen, oxygen, argon, refer to enriched streams, not necessarilyy pure streams. Thus, the oxygen stream can contain anywhere between 35 and 100% oxygen, and the nitrogen stream can contain anywhere from 35 to 100% nitrogen.

There is thus a need for innovative processes and apparatus to reduce NOx in boiler operation, particularly in integrated air separation/power generation plants.

SUMMARY OF THE INVENTION

In accordance with the present invention, integrated air separation/power generation plants are provided, so as to provide the required gases cost-effectively while reducing NOx emissions.

One purpose of this invention is to propose a method to reduce significantly the NOx generation in boiler operation, since issues of environmental concern such as pollutant emissions are now crucial for power generation processes. However, no new technological concept can be implemented without thinking in terms of process efficiency and profitability.

The interest of this invention is thus to present an effective, but also cost-effective technique of NOx reduction through the combination of the steam generation process with an air separation unit in a new design, able to optimize the overall efficiency.

A first aspect of the invention is a combination air separation and steam generation process, the process comprising the steps of:

a) feeding air into an air separation unit, and separating the air into an oxygen-enriched stream and a nitrogen-enriched stream;

b) combining at least a portion of said nitrogen-enriched stream with air to produce an oxygen-depleted first stage air stream, and combining at least a portion of said oxygen-enriched stream with air to produce an oxygen-enriched second stage air stream;

c) mixing a fuel and said oxygen-depleted first stage air stream into a combustion chamber of a steam generation unit and initiating combusting of said fuel with said oxygen-depleted first stage air in said combustion chamber to produce a flue gas;

d) feeding water to said steam generation unit to generate steam by indirect contact of said water with said flue gas; and e) introducing said oxygen-enriched second stage air downstream of said fuel and said oxygen-depleted first stage air to substantially complete combustion of said fuel, thus creating conditions for combustion with substantially low NOx generation.

As used here in "fuel" includes, but is not limited to, gaseous, liquid, and solid fuels, as well as combinations and mixtures thereof. Suitable gaseous fuel include, natural gas, refinery off-gas, sour gas and the like. Suitable liquid fuels include fuel oil (number 2, number 6, bunker C for example). Suitable solid fuel is preferably pulverized coal, but may also include coke, biomass, waste, and the like. As used herein the term "oxygen-depleted" means a stream that has less oxygen than air, in other words, less than about 21 volume percent. "Oxygen-depleted" and "nitrogen-enriched" may be used interchangeably for the purposes of this invention.

Preferred are processes wherein the air separation unit is selected from the group consisting of cryogenic air separation units, membrane air separation units, adsorption air separation units, and combinations thereof; processes wherein the nitrogen-enriched first stage air stream has an oxygen concentration ranging from about 10% (vol) to just less than 21%; processes wherein the nitrogen-enriched first stage air stream has an oxygen concentration ranging from about 15% (vol) to about 19%; processes wherein the oxygen-enriched second stage air stream has an oxygen concentration ranging from about 21% to about 35%.

Further preferred processes in accordance with the first aspect of the invention are those wherein the oxygen-enriched second stage air stream has an oxygen concentration ranging from about 27% to about 33%; processes wherein the nitrogen-enriched primary air has an oxygen concentration ranging from about 8% to about 15% and a flow of unmodified secondary air is allowed to enter the combustion chamber(wherein both primary and secondary air are part of the first stage air, but primary air is injected together with fuel).

Particularly preferred are processes in accordance with the first aspect wherein prior to combining the oxygen-enriched stream with air, the oxygen content required in the second stage air to complete combustion of the fuel is determined, and, if the oxygen content required may match the one of the oxygen-enriched stream, directly injecting the oxygen-enriched stream into the combustion chamber in step(e).

Yet other preferred processes in accordance with the first aspect of the invention are those wherein a balance of the nitrogen-enriched stream produced by the ASU is used for a gas offer. Other preferred processes are those wherein a balance of the oxygen-enriched stream produced by the ASU is used for a gas offer.

Particularly preferred are processes in accordance with the first aspect of the invention wherein the air seperation unit comprises one or more membrane units, wherein the nitrogen-enriched stream leaves this air separation unit at a first pressure, and is expanded in a turbine to form a nitrogen-enriched stream at a second pressure, prior to premixing with first stage air. Also preferred are processes in accordance with the first aspect wherein the turbine drives an air compressor, the air compressor performing the feeding of air into the air separation unit. Also preferred are processes wherein the nitrogen-enriched stream at the second pressure is heated at least to ambient temperature prior to being premixed with first stage air. Preferably, the nitrogen-enriched air is substantially pure nitrogen.

Other preferred processes are those wherein the air in step(b) is preheated by exchanging heat with the flue gas; processes wherein prior to being expanded in the turbine, the nitrogen-enriched gas is preheated; processes wherein the preheating is performed by heat exchange with the flue gases in a preheater, preferably wherein the preheating is performed by heat exchange with flue gases directly inside of the steam generation unit.

In accordance with another aspect of the invention, if the ASU is a cryogenic ASU, preferred are processes wherein the nitrogen-enriched stream exiting the ASU is pressurized in a compressor before being preheated by exchanging heat with flue gases, either in a preheater or directly inside the steam generation unit. Also preferred are processes wherein this nitrogen-enriched flow is expanded in a turbine prior to mixing with first stage air, the turbine driving at the same time the compressor used to pressurize the nitrogen-enriched stream and the compressor used to feed air into the ASU.

More preferably, the nitrogen-enriched stream is pressurized in the ASU, either as a cold gas or as a liquid, before passing through the final heat exchanger of the ASU.

Also preferred are processes wherein the nitrogen-enriched stream generated by the ASU, after being pressurized through the means described above, first exchanges heat with hot flue gas from the steam generation unit, and is then expanded in a turbine, the turbine being connected to a compressor which compresses the oxygen-enriched second stage air; processes wherein this compressed second stage air is finally injected through a Laval nozzle to increase oxidant velocity, preferably above sonic conditions.

A second aspect of the invention is a plant comprising:
a) means for feeding air into an air separation unit, and separating the air into an oxygen-enriched stream and a nitrogen-enriched stream;
b) means for combining at least a portion of said nitrogen-enriched stream with air to produce an oxygen-depleted first stage air stream, and combining at least a portion of said oxygen-enriched stream with air to produce an oxygen-enriched second stage air stream;
c) means for mixing a fuel and said oxygen-depleted first stage air stream into a combustion chamber of a steam generation unit and initiating combusting of said fuel with said oxygen-depleted first stage air in said combustion chamber to produce a flue gas;
d) means for feeding water to said steam generation unit to generate steam by indirect contact of said water with said flue gas; and
e) means for introducing said oxygen-enriched second stage air downstream of said fuel and said oxygen-depleted first stage air to substantially complete combustion of said fuel.

DESCRIPTION OF PREFERRED EMBODIMENTS

Figure 2:
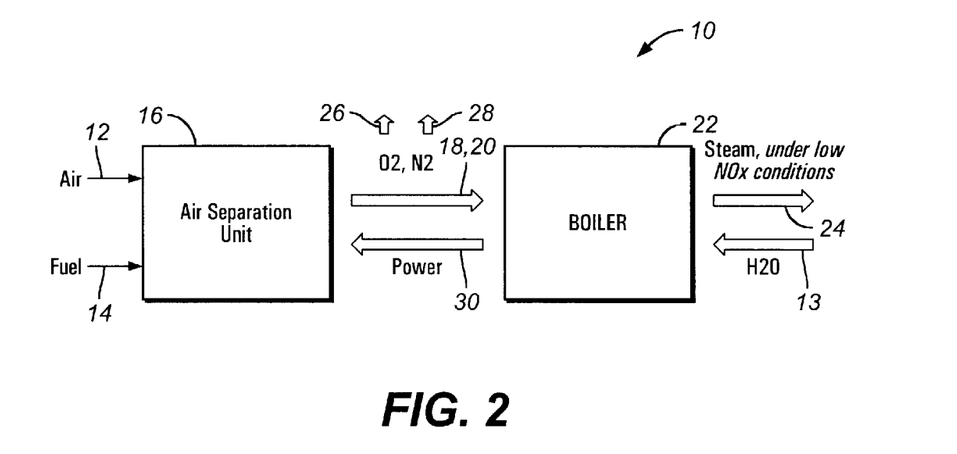
FIG. 2 is a general schematic diagram of an integrated air separation unit/steam generation plant concept in accordance with the invention.

The processes and systems of the invention (the terms "system" and "plant" are used interchangeably) are designed such that the boiler and the air separation unit use, in a complementary way, their respective products (heat for the boiler, oxygen and nitrogen for the ASU), and with great flexibility. FIG. 2 presents the general concepts of the invention. Plant 10 receives air 12, water 13, and fuel 14. Air 12 is fed to an air separation unit (ASU) 16, which may be comprise any of the known ASUs, including cryogenic, membrane, adsorption, and the like. ASU 16 produces at least an oxygen stream 18 and a nitrogen stream 20. At least a portion of the nitrogen and oxygen streams are fed to a boiler 22. Boilers are well known and need little explanation. At least a portion of the power, indicated by arrow 30, generated by boiler 22 is in turn supplied to ASU 16. Excess steam 24, produced under low-NOx conditions, excess oxygen 26, and excess nitrogen 28 are possible output streams, as well as any excess power generated by boiler 22.

An important feature of the processes and plants of the invention is to reduce NOx, not only using the well-known concept of staged combustion, but also to amplify its effects through the enrichment in oxygen of the tertiary air and the depletion in oxygen of the primary and secondary air.

Figure 3:
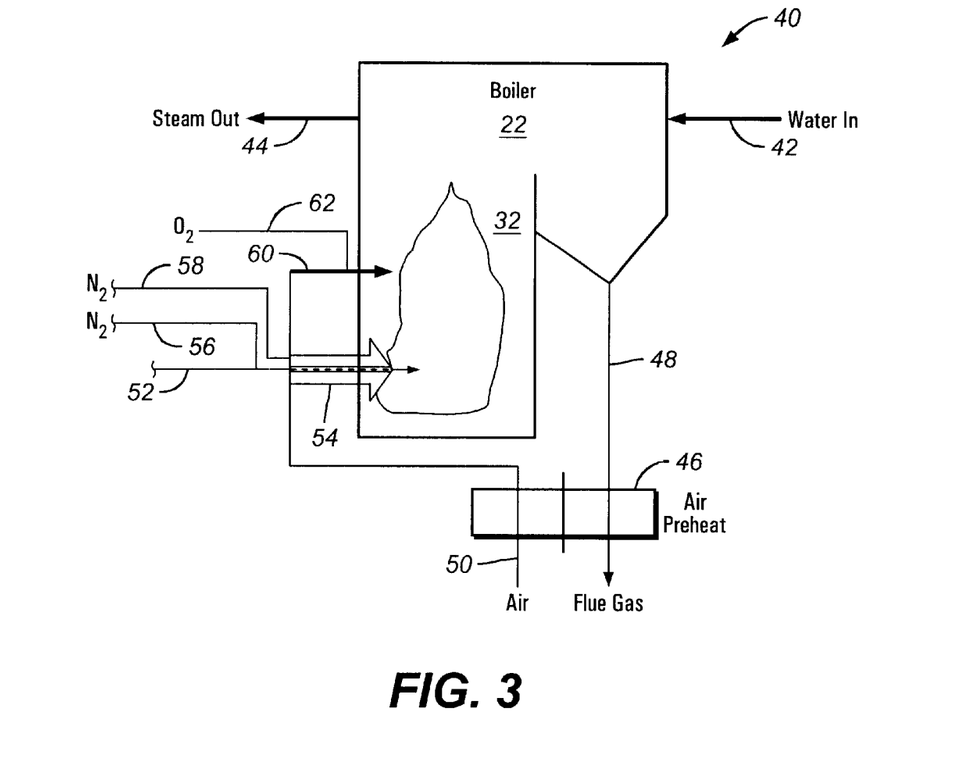
FIG. 3 is process flow schematic of a first embodiment boiler and a staged combustion scheme incorporating the inventive process.

A preferred staged combustion system that can be used for practicing a preferred inventive process with a boiler is illustrated schematically at 40 in FIG. 3. In this over-simplified schematic, water enters boiler 22 through a conduit 42, and steam exits through a conduit 44. An air preheater 46 is provided, wherein hot flue gases routed through conduit 48 are indirectly contacted with incoming air traversing conduit 50. The actual construction of air preheater 46 is not important to an understanding of the invention. It may be a shell and tube heat exchanger, for example. Primary air enters a combustion chamber 32 together with the fuel, as indicated at 52, so as to transport the fuel inside combustion chamber 32. This primary air represents preferably from about 5 to about 20 percent of the overall combustion air, more preferably from about 8 to about 15 percent. Secondary air 54 is introduced into combustion chamber 32 in the same area as the fuel, but in different inlets, typically and preferably in the near vicinity of the primary air. Secondary air accounts for from about 50 percent to about 90 percent of the total combustion air, more preferably from about 60 percent to about 80 percent of the total amount of combustion air. Finally, tertiary air 60 represents the balance of oxidant (preferably from about 10 to about 30 percent of the total combustion air requirement) and is injected downstream of the main combustion products stream, as depicted in FIG. 3.

This invention presents an oxygen enrichment 62 in the tertiary air ranging from about 21 percent (the oxygen concentration in air) to about 35 percent, preferably around 30 percent. At the same time, nitrogen is injected in the primary air at 56, and secondary air at 58, the depleted air in primary and secondary stages containing from about 10 to about 21 percent of oxygen, more preferably from about 15 to about 19 percent. (All percentages are in mole percent unless otherwise noted.)

An alternate enrichment configuration should also be mentioned, designed with safety in mind. As there is always a risk for the fuel (such as pulverized coal) to ignite before being introduced in the boiler, especially when it is premixed with oxidant, a possibility is to decrease strongly the oxygen content in the primary air, down to approximately 10 percent. Hence, the "poor" oxidant does not allow the coal to ignite and the overall level of oxidant depletion is maintained by using unmodified air (21 percent oxygen) for the secondary oxidant.

Figure 4:
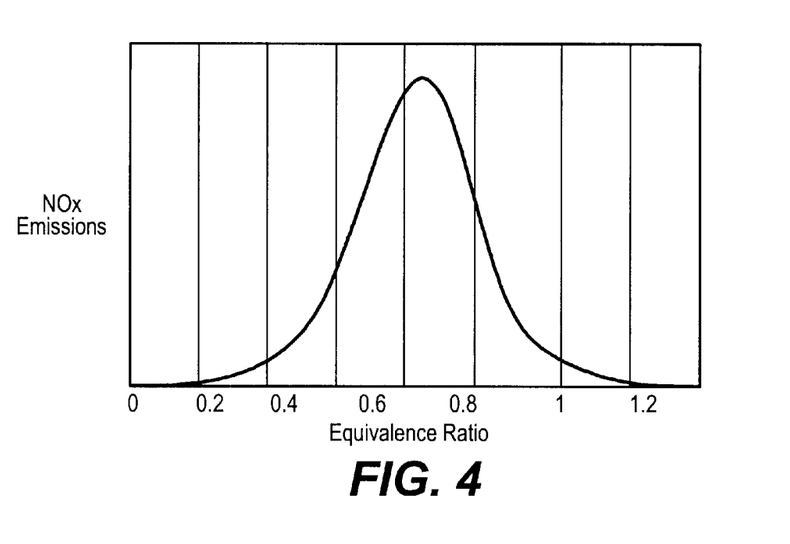
FIG. 4 is a plot of equilibrium NOx emissions versus equivalence ratio.

The first consequence of the inventive methods, and also the most sought after, is a dramatic reduction of NOx emissions. The same type of arguments used for standard air-staged combustion can explain part of this phenomenon. Actually in these conditions, the system fires fuel-rich in the primary zone. So, since little oxidant is available here (80 percent of the total oxidant is injected there, inducing an equivalence ratio of 1.25), very little NOx production occurs, as it is illustrated in FIG. 4, obtained from equilibrium NOx calculations.

Figure 5:
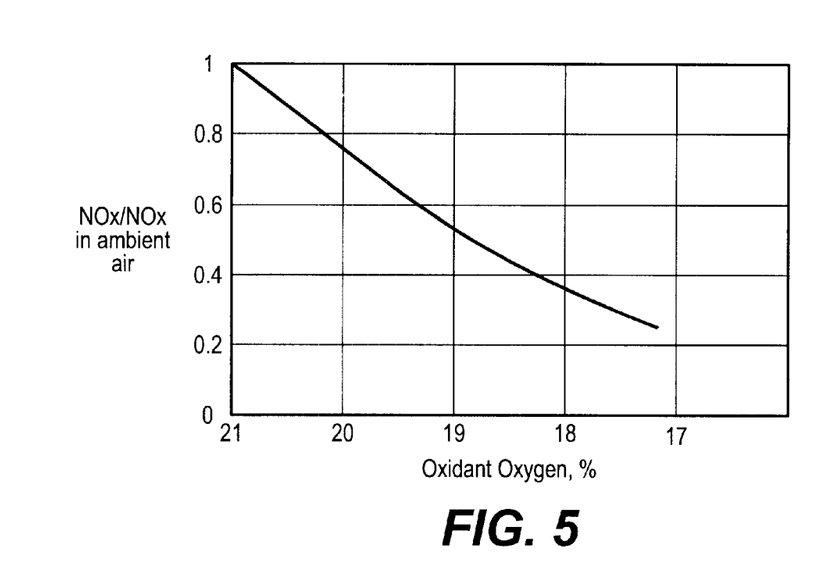
FIG. 5 is a plot of NOx reduction versus percentage oxygen in the combustion oxidant.

Moreover, in the case of our invention, primary and secondary air are depleted in oxygen, through the injection of additional nitrogen in the oxidant flow. Hence, the effect discussed above is even more enhanced since the injected nitrogen acts like a flue gas recirculation (FGR) system: the addition of nitrogen to the burner will reduce both peak flame temperature and local oxygen concentration, limiting NOx emissions. Typical NOx reductions achieved with the addition of nitrogen can be forecast by correlation with results obtained from FGR systems, as illustrated in FIG. 5.

The system illustrated in FIG. 3 thus provides a very good technique to reduce both chemical and thermal NOx since little oxygen is locally present when atomic nitrogen is liberated from the fuel and since the peak flame temperature remains quite limited. The tertiary air stream completes the combustion, burning out all the rich products from the first stage. Even though the oxygen concentration is high in this area, this fuel-lean combustion zone will produce globally low flame temperatures, still limiting NOx production.

Another result of the inventive concepts comes directly from the use of oxygen-enriched air. Even if this enriched stream is only injected in the secondary combustion zone, it will still provide the fuel and/or fuel rich combustion products with enhanced oxidant (when compared to air), leading to a more effective and complete fuel combustion. The tertiary air, by providing high-grade oxidant in a critical stage of the combustion process, will not only balance the loss of heat transfer in the primary zone due to reduced flame temperatures, but will most likely allow global fuel savings and/or heat transfer increase compared to air-based combustion (through creation of local high-temperature zones).

Another advantage of this invention is to combine a low NOx technique with the preservation of the original heat transfer characteristics. This is a very important aspect in boiler operation, since it removes such issues as pipe overheating, due to effects of locally superheating the steam, with negative impact on heat transfer. Theoretically, the use of oxygen-enriched combustion has two consequences to the boiler: it reduces the mass fraction of nitrogen, and it increases the adiabatic temperature of the flame, thus modifying the local heat transfer rates (increase of the radiative transfer and decrease of the convective transfer). In order to preserve the heat transfer patterns the same as for the original air-based case, it should thus be necessary to recirculate a certain mass flow rate of flue gas. This has been the approach in known systems to date.

In the present invention, however, the consequences of the enrichment in oxygen are directly balanced by the depletion of the primary and secondary air in oxygen. Actually, the added nitrogen is playing the same role as the flue gas in a FGR system: it allows maintaining both the average temperature in the flame area and the mass flow rate through the boiler essentially the same as in the air-based case. One main advantage is that the processes and systems of the invention do not require any recirculation equipment, since additional oxygen and nitrogen are coming from an independent device and only affect the injection section of the boiler.

The above explanation has presented the new NOx reduction technique promoted by this invention. Basically, the required inputs are oxygen and nitrogen flows, so as to adjust oxygen contents in the different oxidant injection sections of the boiler. The combined need of oxygen and nitrogen make the processes and plants of the invention very interesting: the combination (preferably integration) of an air separation unit with the "low NOx" steam generation process. This combination will not only provide directly the required oxygen and nitrogen flows, but will also allow using efficiently the synergies between both processes, so as to reduce the overall operation costs.

The following section describes several preferred alternatives promoted by this invention so as to increase the efficiency of the global process according to the chosen air separation system and to the customer needs (gas offer, power generation efficiency).

Figure 6:
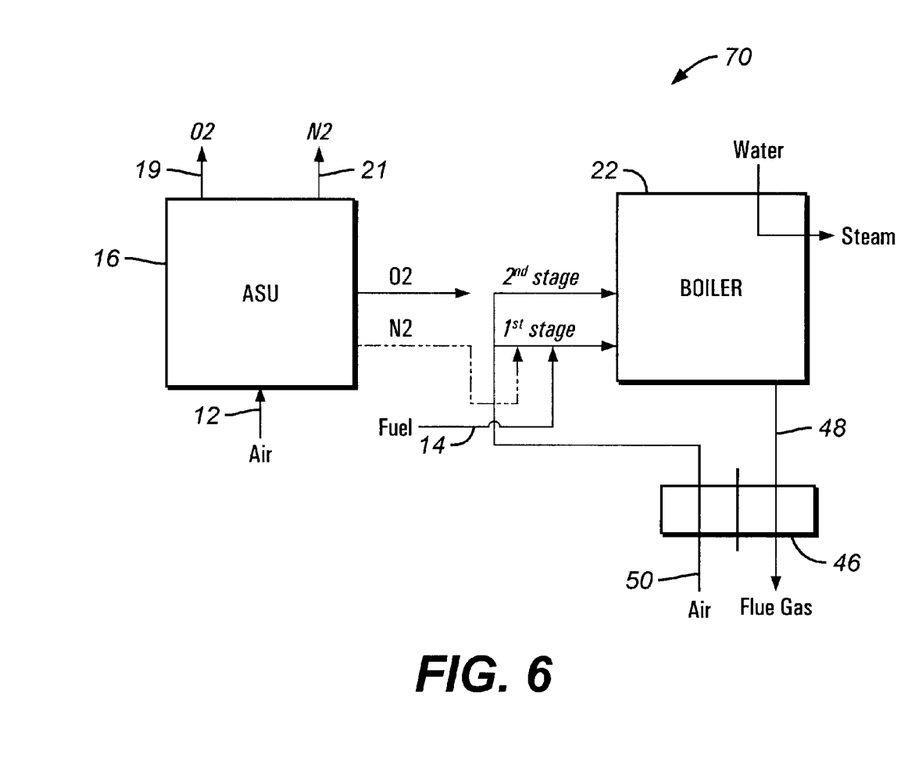
FIG. 6 is a process flow diagram of a second embodiment of an integrated air separation unit/boiler in accordance with the invention.

The system 70 in FIG. 6 presents many of the general principles of the processes and plants of the invention. No particular type of air separation unit is specified for this first generalized embodiment. For simplicity, primary and secondary oxidant streams will now be referred to as a combined "first stage air" (injected in Zone I of FIG. 1), whereas the tertiary oxidant stream will be referred to as "second stage air" (injected into combustion Zone II). Air stream 12 is provided for the air separation unit 16 and, following the separation process, at least gaseous nitrogen 21 and oxygen-enriched air 19 (with oxygen percent $\geq 35$ percent) can be retrieved. Portions of these gases are injected in boiler 22 for the NOx reduction system: nitrogen in conduit 20 in the first stage of combustion, to deplete the first stage air of oxygen, and oxygen in conduit 18 in the second stage, to enrich the second stage air in oxygen. Actually, the amount of gas required for these additional injections is relatively low: if we consider a 80 percent/20 percent repartition between first stage and second stage air, with respectively 18 percent and 30 percent oxygen content, the required oxygen and nitrogen flows to achieve these concentrations will only represent respectively 2 percent and 11 percent of the total volume of oxidant. The remaining gases produced by the ASU can be used for a gas offer. This scheme is actually the most basic option of the concept promoted by this invention, in so far as the ASU provides gases to the boiler but doesn't receive any power in exchange. Such a system can be used to implement easily an efficient NOx reduction method in a power generation process, while producing almost independently gases at the same time.

Figure 7:
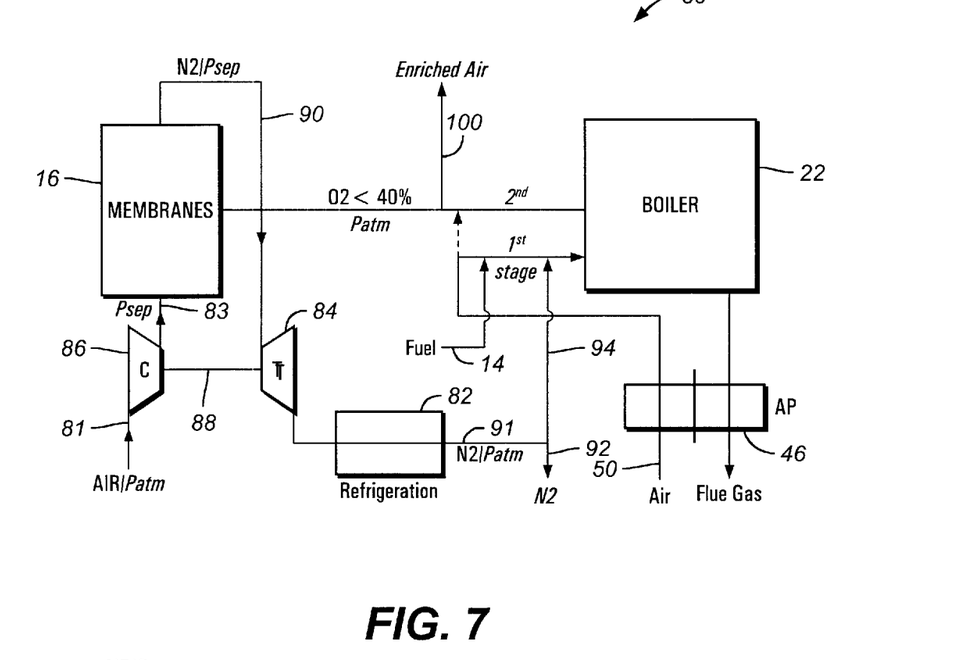
FIGS. 7, 8, 9, and 10 are process flow diagrams of other embodiments of the processes and plants of the invention.

In addition to the general principle of the combination air separation/steam generation toward cost-effective NOx reduction, this invention also proposes different schemes particularly adapted to the special features of the different air separation systems available on the market. They will be presented in the following paragraphs. FIG. 7 describes a preferred integrated plant 80 wherein one or more membrane separation systems is employed as the ASU. (The actual type of membrane is not critical, but may be selected from the non-exclusive list comprising polymeric, ceramic, carbon, and hybrids of these. Methods of making and using membrane ASUs are so commonplace that no further explanation is required here.) Air 81 provided to the membrane system is compressed (to pressures between 1 and 50 bars, preferably above 5 bars) in a compressor 86 to form a compressed air stream 83 having a pressure of Psep prior to being introduced into membrane 16. The separation process and membrane 16 produces a relatively pure nitrogen stream 90 under high pressure (approximately equal to the pressure of separation, Psep) and an oxygen-enriched air stream 98 at atmospheric pressure, with an oxygen content below 40 percent. At least a portion of the nitrogen stream 90 is sent through a gas turbine 84, which is connected to compressor 86 via a shaft 88, thus providing part of the required power. The resulting reduced pressure cold flow of nitrogen is then passed through a refrigeration unit 82, so as to bring nitrogen to, at least, the ambient temperature in conduit 91. Finally, the required amount of nitrogen is injected via conduit 94 in the first stage air, in order to deplete the first stage air in oxygen, whereas the remaining flow of nitrogen 92 is preferably used as a gas offer. Regarding the oxygen-enriched air flow 98 produced by the membrane system 16, two alternatives can be envisaged. If the oxygen content matches the required content for the second stage air, in this case the flow is preferably injected directly into the boiler. If the oxygen content is higher than required (say 40 percent, for a required oxidant with 25 percent oxygen), this enriched air can be mixed with air before injection. In both cases, the remaining flow of oxygen-enriched air can also be used by the customer as a gas offer, as indicated at 100.

The preferred scheme in FIG. 7 is therefore a first step toward an efficient combination, preferably integration, of both processes. The air separation process is achieved with significant power savings, through the effective use of the pressure still contained in the nitrogen flow after separation. It thus allows reducing NOx dramatically in the power generation process while producing at the same time and cost-effectively some valuable gases (oxygen-enriched air and relatively pure nitrogen).

Figure 8:
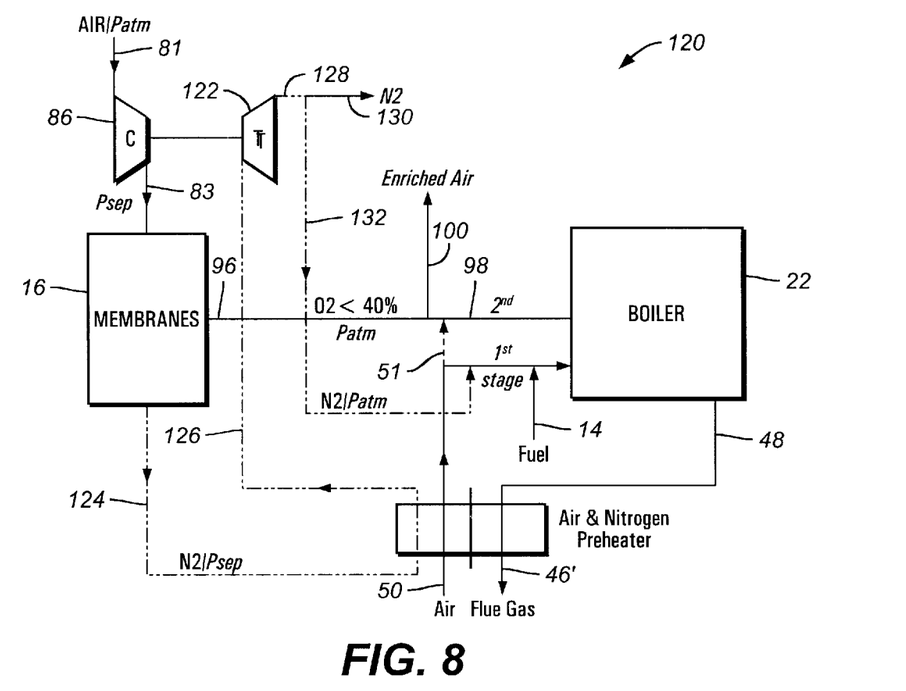

FIG. 8 presents a preferred, more integrated version 120 of the combination of the ASU and steam generation processes. The principle of embodiment 120 is exactly the same as embodiment 80 in FIG. 7, except that the pressurized flow of nitrogen 124 is preheated in air preheater 46' to the desired temperature before being sent through the turbine 122 to produce the low pressure nitrogen stream 132. This preheating can also be achieved through a heat exchange with boiler flue gases directly inside boiler 22. One primary advantage of this configuration is that the ASU air compressor 86 can then be fully powered by gas turbine 122, leading to a "zero additional power" production of gases, in addition to NOx reduction in the boiler operation. Additional nitrogen 130 may be used in the plant for other purposes or as a gas offer, and can the oxygen-enriched air 100.

Figure 9:
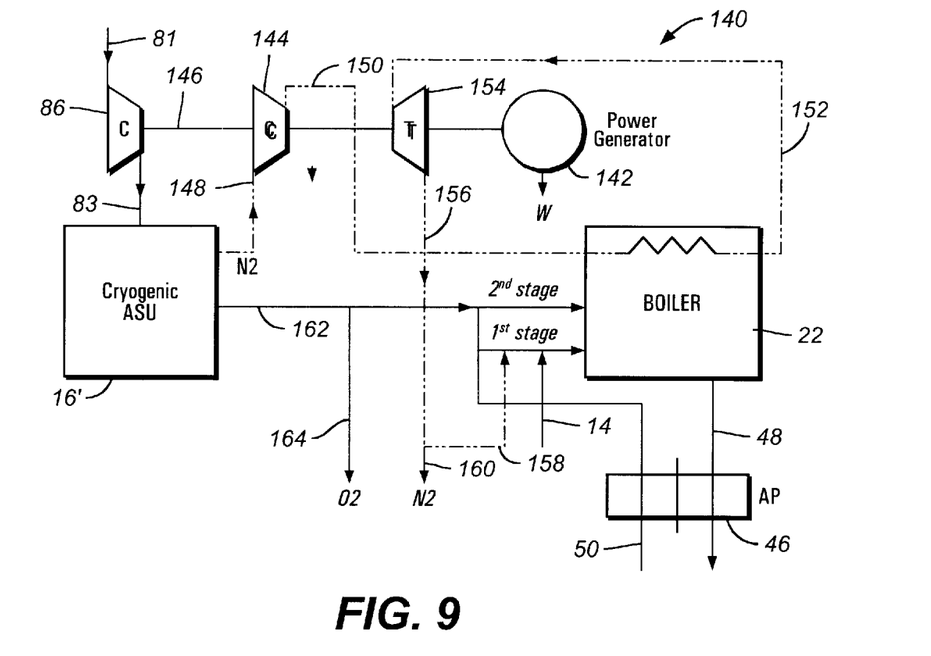

FIG. 9 presents an alternate embodiment 140, using a cryogenic ASU 16'. In this case, the following streams can be retrieved from the ASU: liquid nitrogen (not shown), liquid oxygen (not shown), liquid argon (not shown), gaseous oxygen at 162 and gaseous nitrogen at 148. The gaseous flow of nitrogen 148, representing the main part of the overall resulting mass (given the ratio between nitrogen and oxygen in the air), is first compressed in compressor 144 to form a compressed nitrogen stream 150 at the desired pressure, after exiting cryogenic ASU 16' at atmospheric pressure (unlike in membranes systems). The compressed nitrogen stream 150 is then preheated to form a preheated gaseous nitrogen stream 152, either inside boiler 22 (see FIG. 9) or outside through heat exchange with flue gases. Finally, the compressed/heated nitrogen flow 152 is sent through a gas turbine 154, which is connected preferably both to the above-mentioned compressor 144 and to a generator 142, where additional power is generated. As the nitrogen exits the turbine at 156, the required amount of nitrogen gas to deplete the first stage air is directed toward the boiler in stream 158. Regarding the pure oxygen flow 162 it is mixed with air to achieve the desired oxygen enrichment and then injected in the second stage of combustion. For both streams, the remaining flows (164 for oxygen and 160 for nitrogen) are available for the customer as a gas offer.

Additional integration can be envisioned between the ASU and the power generation: as it is illustrated in FIG. 9, the incoming air 81 into ASU 16' is compressed in compressor 86 preferably powered at least in part by the nitrogen gas turbine 154. This way, all the losses in the power generator can be eliminated, further enhancing the cycle efficiency.

In addition, another embodiment can be envisaged related to the nitrogen circuit: in this scheme, nitrogen compressor 144 downstream of the ASU is removed. The nitrogen is pressurized in the ASU unit, either as a cold gas, or preferably as a liquid. For this purpose, before passing through the final heat exchanger of the ASU, the liquid nitrogen resulting in the distillation column is passed through a pump, thus raising the liquid pressure to the desired level. This alternative can, hence, be considered as a more complete integration between the air separation and the power generation processes, since the air separation process will adjust the outlet parameters of its gaseous product according to the power generation requirements.

Figure 10:
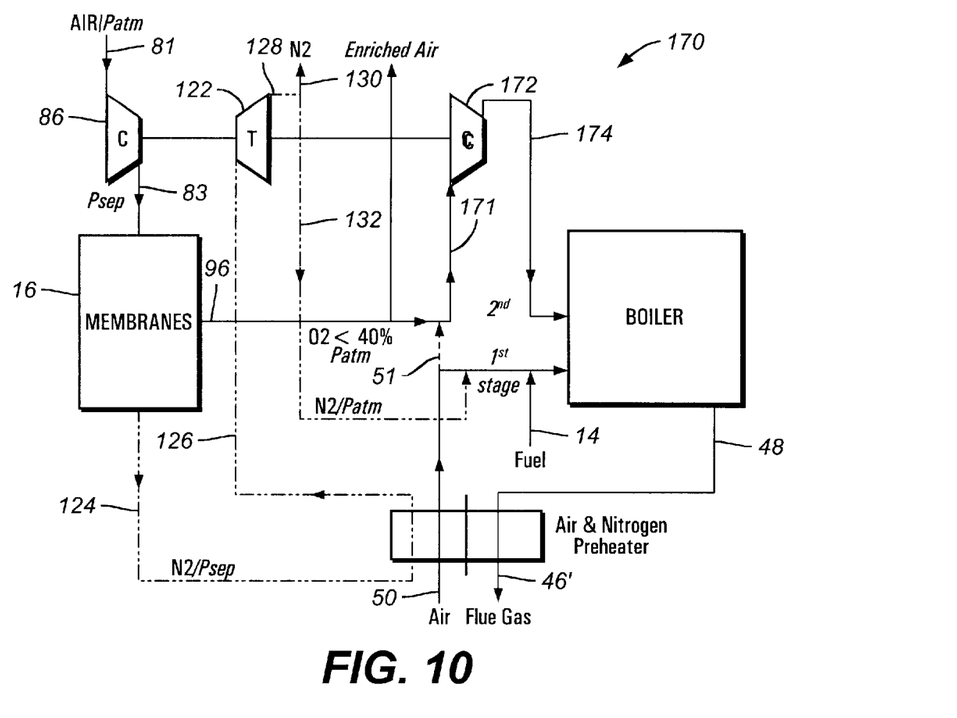

FIG. 10 describes another embodiment 170 proposed by this invention. The purpose here is to introduce a high velocity stream of oxygen-enriched gas into the second stage of combustion. A membrane ASU 16 is provided, producing a nitrogen-rich stream 124 at Psep, and an oxygen-enriched air stream 96. At least a portion of oxygen-enriched air stream 96 is preferably combined with a preheated air stream 51 produced via heat exchange in air and nitrogen preheated 46'. A combined oxygen-enriched air stream 171 is subsequently routed to a compressor 172 that forms a compressed oxygen-enriched air stream 174, which is fed at high velocity into boiler 22 at the second stage. The velocity of the stream can be subsonic or supersonic, but preferably supersonic: Vox ≦2Vs, where Vs is the sonic velocity of the oxidant stream in the conditions of use. Nitrogen-enriched stream 124 is routed to gas turbine 122 and expanded to produce power for air compressor 86, and a low-pressure nitrogen stream 128, at least a portion of which is routed through conduit 132 to mix with first stage combustion air, thus depleting it in oxygen.

The results of the embodiment of FIG. 10 are: providing the fuel rich combustion products with enhanced oxidants (as claimed before), but also improving the mixing between these combustion products and the oxidant. The combined effect of high oxygen concentration and improved mixing will lead to a more effective and complete combustion, while still reducing dramatically the NOx generation.

The embodiment of FIG. 10 is proposed with a membrane system, which allows using a nitrogen flow 124 already under pressure. As mentioned before, this stream 124 can be, and preferably is, heated inside the boiler or through an exchange with hot flue gases before being sent through gas turbine 122. The particularity of this system is the fact that turbine 122 is connected not only to air compressor 86 located upstream the membrane, but also with an additional compressor 172. Actually, compressor 172 is used to compress the second stage air (obtained after mixing between air 51 and the oxygen-enriched air 96 resulting from the ASU) before injecting it preferably through a De Laval tuyere, so as to increase oxidant velocity above sonic conditions.

In addition to a dramatic enhancement of the mixing process, the embodiment of FIG. 10 also allows using lower level of enrichment: less than 2 percent of enrichment can be used to achieve an even more complete combustion.

This concept can also be applied to cryogenic systems: the same scheme described in FIG. 9 can then be implemented, with an additional compressor used to bring the second stage air to the desired pressure, as illustrated in FIG. 10 (in this case, power generator 142 in FIG. 9 can be removed, if necessary).

In summary, the invention proposes innovative techniques of NOx reduction in boiler operation through a combination of the concepts of air-staged combustion with air separation. The inventive processes and plants, which basically consist in a modification of the oxygen content in the different stages of combustion, will require an additional injection of nitrogen and oxygen. An ASU can not only provide directly the required amounts of nitrogen and oxygen to the steam generator but it also allows enhancing the efficiency of the overall process by implementing smart and adapted combinations of both systems. It is noted that the processes and plants presented in this patent can be further refined and optimized according to customer needs, such that the efficiency of the process be maximized.

The primary advantages of the invention are listed below:

High thermodynamic efficiency, due to the efficient use of the synergies between the ASU and the steam generation process. Thus, any residual pressure of the gases exiting the ASU or any residual heat exiting the boiler is recovered, thus increasing the overall efficiency.

High degree of flexibility, at different levels. Firstly, both cryogenic and membranes ASU can be used efficiently in this combined (preferably integrated) process. Secondly, the combination (preferably integration) of the ASU can be more or less important according to the capital investment; actually, the implementation of a few gas compressors, turbines and heat exchangers can allow producing nitrogen and enriched air with almost no additional power. Finally, levels of enrichment and depletion in the different stages of the boiler can be adjusted so as to meet the customer needs in terms of steam production, fuel consumption and NOx emissions.

Few modifications are required on existing boilers. Moreover, heat transfer patterns are very slightly affected (no flue gas recirculation required). Boiler operators should appreciate both of these aspects.

Use of a very clean fluid: Nitrogen. Therefore, compressors, turbines, heat exchangers, and the like, are not exposed to any type of impurities or corrosive action. This can indefinitely extend the life of the equipment.

This invention can therefore be of great importance to the field of power generation and air separation since it addresses an issue of great environmental importance, NOx generation, through an efficient and cost-effective combination (preferably integration) of both processes.

Although the above description of preferred processes and systems of the invention are representative of the invention, they are by no means intended to limit the appended claims.

What is claimed is:

1. A combination air separation and steam generation process, the process comprising the steps of:
   a) feeding air into an air separation unit, and separating the air into an oxygen-enriched stream and a nitrogen-enriched stream;
   b) combining at least a portion of said nitrogen-enriched stream with air to produce an oxygen-depleted first stage air stream, and combining at least a portion of said oxygen-enriched air stream with air to produce an oxygen-enriched second stage air stream;
   c) mixing a fuel and said oxygen-depleted first stage air stream into a combustion chamber of a steam generation unit and initiating combustion of said fuel with said oxygen-depleted first stage air in said combustion chamber to produce a flue gas;
   d) feeding water to said steam generation unit to generate steam by indirect contact of said water with said flue gas; and
   e) introducing said oxygen-enriched second stage air downstream of said fuel and said oxygen-depleted first stage air to substantially complete combustion of said fuel, the process thus significantly reducing NOx formation.

2. The process of claim 1 wherein the air separation unit is selected from the group consisting of cryogenic air separation units, membrane air separation units, adsorption air separation units, and combinations thereof.

3. The process of claim 1 wherein the oxygen-depleted first stage air stream has an oxygen concentration ranging from about 10% by volume to just less than 21%.

4. The process of claim 1 wherein the oxygen-depleted first stage air stream has an oxygen concentration ranging from about 15% by volume to just less than 19%.

5. The process of claim 1 wherein the oxygen-enriched second stage air stream has an oxygen concentration ranging from about 21% to about 35%.

6. The process of claim 1 wherein the oxygen-enriched second stage air stream has an oxygen concentration ranging from about 27% to about 33%.

7. The process of claim 3, wherein a first portion of the oxygen-depleted first stage air stream is injected together with the fuel, said first portion having an oxygen concentration ranging from about 8% to about 15%, and a remaining portion of the oxygen-depleted first stage air stream is allowed to enter the combustion chamber.

8. The process of claim 1 wherein a balance of said nitrogen-enriched stream produced by the ASU is used for a gas offer.

9. The process of claim 1 wherein a balance of said oxygen-enriched stream produced by the ASU is used for a gas offer.

10. The process of claim 1 wherein the air separation unit comprises one or more membrane units, wherein the nitrogen-enriched stream leaves the air separation unit at a first pressure, and is expanded in a turbine to form a nitrogen-enriched stream at a second pressure, prior to premixing with first stage air.

11. The process of claim 10 wherein the turbine drives an air compressor, the air compressor performing the feeding of air into the air separation unit.

12. The process of claim 10 wherein the nitrogen-enriched stream at said second pressure is heated at least to ambient temperature prior to being premixed with said first stage air.

13. The process of claim 1 wherein said nitrogen-enriched air is substantially pure nitrogen.

14. The process of claim 1 wherein prior to combining said oxygen-enriched stream with air, determining the oxygen content required in the second stage air to complete combustion of said fuel, and, if said oxygen content required may match the one of said oxygen-enriched stream, directly injecting the oxygen-enriched stream into the combustion chamber in step (e).

15. The process of claim 1 wherein the air in step (b) is preheated by exchanging heat with said flue gas.

16. The process of claim 10 wherein prior to being expand in said turbine, said nitrogen-enriched gas is preheated.

17. The process of claim 16 wherein said preheating is performed by heat exchange with the flue gases in a preheater.

18. The process of claim 16 wherein said preheating is performed by heat exchange with flue gases directly inside of said steam generation unit.

19. The process of claim 1 wherein the air separation unit is a cryogenic air separation unit, and wherein the nitrogen-enriched stream which leaves the air separation unit is pressurized through a compressor before being preheated by exchanging heat with said flue gas.

20. The process of claim 19 wherein said preheating is performed by heat exchange with the flue gases in a pre-heater.

21. The process of claim 19 wherein said preheating is performed by heat exchange with flue gases directly inside of said steam generation unit.

22. The process of claim 19 wherein the preheated, pressurized nitrogen-enriched stream is expanded in a turbine prior to mixing with first stage air.

23. The process of claim 22 wherein said turbine drives an air compressor, the air compressor performing the feeding of air into the air separation unit.

24. The process of claim 22 wherein said turbine drives the compressor used to pressurize the nitrogen-enriched stream exiting the air separation unit.

25. The process of claim 19, wherein the nitrogen-enriched stream is pressurized in the air separation unit, either as a cold gas or as a liquid, before passing through the final heat exchanger of the air separation unit.

26. The process of claim 1 wherein the nitrogen-enriched stream, after being pressurized, first exchanges heat with hot flue gas from said steam generation unit, and is then expanded in a turbine, the turbine being connected to a compressor which compresses the oxygen-enriched second stage air; this second stage air being finally injected through a Laval nozzle to increase oxidant velocity, preferably above sonic conditions.

27. A plant comprising:
a) means for feeding air into an air separation unit, and separating the air into an oxygen-enriched stream and a nitrogen-enriched stream;
b) means for combining at least a portion of said nitrogen-enriched stream with air to produce an oxygen-depleted first stage air stream, and combining at least a portion of said oxygen-enriched stream with air to produce an oxygen-enriched second stage air stream;
c) means for mixing a fuel and said oxygen-depleted first stage air stream into a combustion chamber of a steam generation unit and initiating combusting of said fuel with said oxygen-depleted first stage air in said combustion chamber to produce a flue gas;
d) means for feeding water to said steam generation unit to generate steam by indirect contact of said water with said flue gas; and
e) means for introducing said oxygen-enriched second stage air downstream of said fuel and said oxygen-depleted first stage air to substantially complete combustion of said fuel.

28. The plant of claim 27 wherein the oxygen-depleted first stage air stream comprises an oxygen-depleted primary air stream and an oxygen depleted secondary air stream, and the second stage air stream comprises an oxygen-enriched tertiary air stream.

* * * * *

UNITED STATES PATENT AND TRADEMARK OFFICE
CERTIFICATE OF CORRECTION

PATENT NO. : 6,568,185 B1
DATED : May 27, 2003
INVENTOR(S) : Ovidiu Marin and Erwin Penfornis It is certified that error appears in the above-identified patent and that said Letters Patent is hereby corrected as shown below:

Column 16,
Line 60, please delete the word "expand" and insert the word -- expanded --.

Signed and Sealed this

Seventh Day of October, 2003

JAMES E. ROGAN
*Director of the United States Patent and Trademark Office*